United States Patent
Pan et al.

(10) Patent No.: US 7,796,678 B2
(45) Date of Patent: *Sep. 14, 2010

(54) COMMUNICATION SYSTEM WITH RECEIVERS EMPLOYING GENERALIZED TWO-STAGE DATA ESTIMATION

(75) Inventors: Kyle Jung-Lin Pan, Smithtown, NY (US); Yuejin Huang, Holbrook, NY (US); Donald M. Grieco, Manhassett, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/468,354

(22) Filed: May 19, 2009

(65) Prior Publication Data

US 2009/0225815 A1 Sep. 10, 2009

Related U.S. Application Data

(63) Continuation of application No. 12/135,577, filed on Jun. 9, 2008, now Pat. No. 7,545,851, which is a continuation of application No. 11/455,999, filed on Jun. 20, 2006, now Pat. No. 7,386,033, which is a continuation of application No. 11/138,816, filed on May 26, 2005, now Pat. No. 7,079,570, which is a continuation of application No. 10/753,631, filed on Jan. 8, 2004, now Pat. No. 6,937,644.

(60) Provisional application No. 60/439,284, filed on Jan. 10, 2003.

(51) Int. Cl.
*H04B 1/707* (2006.01)
*H04K 1/10* (2006.01)

(52) U.S. Cl. ........................ 375/147; 375/260

(58) Field of Classification Search ......... 375/141–144, 375/147, 148, 150, 152, 260, 262, 265, 343, 375/346; 370/208, 210, 320, 335, 342

See application file for complete search history.

(56) References Cited

U.S. PATENT DOCUMENTS 6,122,015 A 9/2000 Al-Dhahir et al.
(Continued)

FOREIGN PATENT DOCUMENTS

KR 1999-0079971 11/1999
(Continued)

OTHER PUBLICATIONS

Pan et al., "Low Complexity Data Detection Using Fast Fourier Transform Decomposition of Channel Correlation Matrix," InterDigital Communications Corp., Nov. 2001.
(Continued)

*Primary Examiner*—Young T. Tse
(74) *Attorney, Agent, or Firm*—Volpe and Koenig, P.C.

(57) ABSTRACT

A wireless transmit/receive unit (WTRU) is configure to receive and sample wireless signals in a shared spectrum where the wireless signal comprise encoded symbols. The WTRU has a channel estimation device configured to process received signal samples to produce an estimate of a channel response of the received signals corresponding to a matrix H. The channel estimation device is preferably configured to process the received signal samples to produce an estimate of noise variance of the received signals. The WTRU preferably has a two stage data estimator that includes a channel equalizer and a despreader. The channel equalizer is configured to process received signal samples using the estimated channel response matrix H and the estimate of noise variance to produce a spread signal estimate of the received signals. The despreader is configured to process the spread signal estimate of the received signals produced by said channel equalizer to recover encoded symbols of the received signals.

16 Claims, 3 Drawing Sheets

U.S. PATENT DOCUMENTS

| | | |
|---|---|---|
| 6,545,990 B1 | 4/2003 | Amalfitano et al. |
| 6,625,203 B2 | 9/2003 | De et al. |
| 6,928,104 B2 | 8/2005 | Pan et al. |
| 6,963,546 B2 | 11/2005 | Misra et al. |
| 2002/0024994 A1 | 2/2002 | Piirainen et al. |
| 2002/0146063 A1* | 10/2002 | Gorokhov et al. ........... 375/148 |
| 2003/0095585 A1 | 5/2003 | Huh et al. |
| 2003/0095586 A1 | 5/2003 | Geers |
| 2003/0165131 A1 | 9/2003 | Liang et al. |
| 2003/0219064 A1 | 11/2003 | Pan et al. |
| 2004/0013171 A1 | 1/2004 | Pan et al. |
| 2004/0131010 A1 | 7/2004 | Pan et al. |
| 2004/0136316 A1 | 7/2004 | Kwak et al. |
| 2004/0223538 A1 | 11/2004 | Zeira |
| 2004/0228295 A1* | 11/2004 | Zhang et al. ................ 370/320 |
| 2004/0240587 A1 | 12/2004 | Ozen |

FOREIGN PATENT DOCUMENTS

| | | |
|---|---|---|
| WO | 99/59351 | 11/1999 |
| WO | 02/063779 | 8/2002 |
| WO | 02/082268 | 10/2002 |
| WO | 02/089346 | 11/2002 |

OTHER PUBLICATIONS

Pan et al., "Complexity and Efficiency of Data Detection Algorithms for TD-SCDMA," Personal, Indoor and Mobile Radio Communications, 15$^{th}$ IEEE International Symposium, vol. 2, pp. 1287-1291, Sep. 2004.

Vollmer et al., "Joint-Detection Using Fast Fourier Transforms in TD-CDMA Based Mobile Radio Systems", Proceedings of the International Conference on Telecommunications, 1999, pp. 1-7.

Vollmer et al., "Comparative Study of Joint-Detection Techniques for TD-CDMA Based Mobile Radio Systems", 2001 IEEE Journal on Selected Areas in Communications, vol. 19, No. 8, Aug. 2001, pp. 1461-1475.

* cited by examiner

//COMMUNICATION SYSTEM WITH RECEIVERS EMPLOYING GENERALIZED TWO-STAGE DATA ESTIMATION

CROSS REFERENCE TO RELATED APPLICATION(S)

This application is a continuation of U.S. patent application Ser. No. 12/135,577, filed Jun. 9, 2008, now U.S. Pat. No. 7,545,851, which is a continuation of Ser. No. 11/455,999, filed Jun. 20, 2006, now U.S. Pat. No. 7,386,033, which is a continuation of U.S. patent application Ser. No. 11/138,816, filed May 26, 2005, now U.S. Pat. No. 7,079,570, which is a continuation of U.S. patent application Ser. No. 10/753,631, filed Jan. 8, 2004, now U.S. Pat. No. 6,937,644, which claims priority from U.S. Provisional Application No. 60/439,284, filed Jan. 10, 2003, which are incorporated by reference herein.

FIELD OF INVENTION

The present invention relates to wireless communication systems. More particularly, the present invention is directed to data estimation in such systems.

BACKGROUND

In wireless systems, joint detection (JD) is used to mitigate inter-symbol interference (ISI) and multiple-access interference (MAI). JD is characterized by good performance but high complexity. Even using approximate Cholesky or block Fourier transforms with Cholesky decomposition algorithms, the complexity of JD is still very high. When JD is adopted in a wireless receiver, its complexity prevents the receiver from being implemented efficiently. This evidences the need for alternative algorithms that are not only simple in implementation but also good in performance.

To overcome this problem, prior art receivers based on a channel equalizer followed by a code despreader have been developed. These types of receivers are called single user detection (SUD) receivers because, contrary to JD receivers, the detection process does not require the knowledge of channelization codes of other users. SUD tends to not exhibit the same performance as JD for most data rates of interest, even though its complexity is very low. Accordingly, there exists a need for low complexity high performance data detectors.

SUMMARY

A wireless transmit/receive unit (WTRU) is configured to receive and sample wireless signals in a shared spectrum where the wireless signals comprise encoded symbols. The WTRU has a channel estimation device configured to process received signal samples to produce an estimate of a channel response of the received signals corresponding to a matrix H. The channel estimation device is further configured to process the received signal samples to produce an estimate of noise variance of the received signals. The WTRU has a two stage data estimator that includes a channel equalizer and a despreader. The channel equalizer is configured to process received signal samples using the estimated channel response matrix H and the estimate of noise variance to produce a spread signal estimate of the received signals. The despreader is configured to process the spread signal estimate of the received signals produced by said channel equalizer to recover encoded symbols of the received signals.

Preferably, codes of the signals are processed using a block Fourier transform (FT), producing a code block diagonal matrix. A channel response matrix is estimated. The channel response matrix is extended and modified to produce a block circulant matrix, and a block FT is taken producing a channel response block diagonal matrix. The code block diagonal matrix is combined with the channel response block diagonal matrix. The received signals are sampled and processed using the combined code block diagonal matrix and channel response block diagonal matrix with a Cholesky algorithm. A block inverse FT is performed on a result of the Cholesky algorithm to produce spread symbols. The spread symbols are despread to recover symbols of the received signals.

DETAILED DESCRIPTION OF THE PREFERRED EMBODIMENTS

Figure 1:
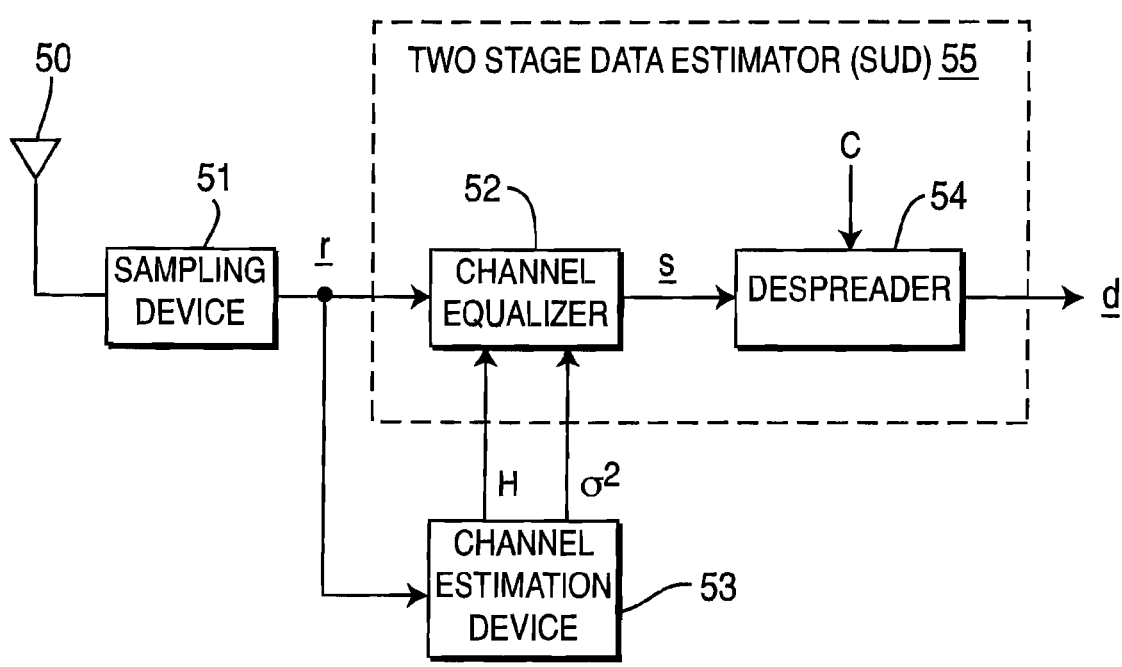
FIG. 1 is a block diagram showing a two stage data detection.

The present invention will be described with reference to the drawing figures where like numerals represent like elements throughout.

A two stage data estimator can be used in a wireless transmit/receive unit (WTRU) or base station, when all of the communications to be detected by the estimator experience a similar channel response. Although the following is described in conjunction with the preferred proposed third generation partnership project (3GPP) wideband code division multiple access (W-CDMA) communication system, it is applicable to other systems.

FIG. 1 is a simplified block diagram of a receiver using a two stage data estimator 55. An antenna 50 or antenna array receives radio frequency signals. The signals are sampled by a sampling device 51, typically at the chip rate or at a multiple of the chip rate, producing a received vector r. A channel estimation device 53 using a reference signal, such as a midamble sequence or pilot code, estimates the channel response for the received signals as a channel response matrix H. The channel estimation device 53 also estimates the noise variance, $\sigma^2$.

The channel equalizer 52 takes the received vector r and equalizes it using the channel response matrix H and the noise variance $\sigma^2$, producing a spread symbol vector s. Using codes C of the received signals, a despreader 54 despreads the spread symbol vectors, producing the estimated symbols d.

With joint detection (JD), a minimum mean square error (MMSE) formula with respect to the symbol vector d can be expressed as:

$$\hat{d} = (A^H R_n^{-1} A + R_d^{-1})^{-1} A^H R_n^{-1} r; \qquad \text{Equation (1)}$$

or $$\hat{d} = R_d A^H (A R_d A^H + R_n)^{-1} r; \qquad \text{Equation (2)}$$

where d̂ is the estimate of d, r is the received signal vector, A is the system matrix, $R_n$ is the covariance matrix of noise sequence, $R_d$ is the covariance matrix of the symbol sequence and the notation $(.)^H$ denotes the complex conjugate transpose (Hermitian) operation. The dimensions and structures of the above vectors and matrixes depend on specific system design. Usually, different systems have different system parameters such as frame structure, length of data field and length of delay spread.

The matrix A has different dimensions for different systems, and the dimensions of matrix A depend on the length of data field, number of codes, spreading factor and length of delay spread. By way of example, for the transmission of 8 codes with spreading factor of 16 each, the matrix A has dimensions of 1032 by 488 for a WCDMA TDD system if burst type 1 is used and for a delay spread of 57 chips long, while matrix A has dimensions of 367 by 176 for TD-SCDMA system for a delay spread of 16 chips long.

Assuming white noise and uncorrelated symbols with unity energy, $R_n = \sigma^2 I$ and $R_d = I$, where I denotes the identity matrix. Substitution of these into Equations 1 and 2 results in:

$$\hat{d} = (A^H A + \sigma^2 I)^{-1} A^H r, \quad \text{Equation (3)}$$

or $$\hat{d} = A^H (A A^H + \sigma^2 I)^{-1} r. \quad \text{Equation (4)}$$

The received signal can be viewed as a composite signal, denoted by s, passed through a single channel. The received signal r may be represented by r=Hs, where H is the channel response matrix and s is the composite spread signal. H takes the form of:

$$H = \begin{bmatrix} h_0 & & & & \\ h_1 & h_0 & & & \\ \ldots & h_1 & \ldots & & \\ \ldots & \ldots & \ldots & \ldots & \\ h_{W-1} & \ldots & & \ldots & \ldots \\ & h_{W-1} & & \ldots & \ldots \\ & & \ldots & & \ldots & \ldots \\ & & \ldots & & \ldots & h_0 \\ & & & & \ldots & h_1 \\ & & & & \ldots & \ldots \\ & & & & & \ldots & \ldots \\ & & & & & & h_{W-1} \end{bmatrix}. \quad \text{Equation (5)}$$

In Equation (5), W is the length of the channel response, and is therefore equal to the length of the delay spread. Typically W=57 for W-CDMA time division duplex (TDD) burst type 1 and W=16 for time division synchronous CDMA (TD-SCDMA). The composite spread signal s can be expressed as s=Cd, where the symbol vector d is:

$$d = (d_1, d_2, \ldots, d_{KN_s})^T, \quad \text{Equation (6)}$$

and the code matrix C is:

$$C = [C^{(1)}, C^{(2)}, \ldots, C^{(K)}] \quad \text{Equation (7)}$$

with:

$$C^{(k)} = \begin{bmatrix} c_1^{(k)} & & & & \\ \ldots & & & & \\ c_Q^{(k)} & & & & \\ \ldots & c_1^{(k)} & & & \\ & \ldots & & & \\ & c_Q^{(k)} & \ldots & & \\ & & \ldots & & \\ & & \ldots & & \\ & & \ldots & & \\ & & & \ldots & c_1^{(k)} \\ & & & & \ldots \\ & & & & c_Q^{(k)} \end{bmatrix}. \quad \text{Equation (8)}$$

Q, K and $N_s$ denote the spread factor (SF), the number of active codes and the number of symbols carried on each channelization code, respectively. $c_i^{(k)}$ is the $i^{th}$ element of the $k^{th}$ code. The matrix C is a matrix of size $N_s \cdot Q$ by $N_s \cdot K$.

Substitution of A=HC into Equation (4) results in:

$$\hat{d} = C^H H^H (H R_c H^H + \sigma^2 I)^{-1} r \quad \text{Equation (9)}$$

where $R_c = CC^H$. If ŝ denotes the estimated spread signal, Equation (9) can be expressed in two stages:

Stage 1:

$$\hat{s} = H^H (H R_c H^H + \sigma^2 I)^{-1} r \quad \text{Equation (10)}$$

Stage 2:

$$\hat{d} = C^H \hat{s}. \quad \text{Equation (11)}$$

The first stage is the stage of generalized channel equalization. It estimates the spread signal s by an equalization process per Equation 10. The second stage is the despreading stage. The symbol sequence d is recovered by a despreading process per Equation 11.

The matrix $R_c$ in Equation 9 is a block diagonal matrix of the form:

$$R_C = \begin{bmatrix} R_0 & & & \\ & R_0 & & \\ & & \ddots & \\ & & & R_0 \end{bmatrix}, \quad \text{Equation (12)}$$

The block $R_0$ in the diagonal is a square matrix of size Q. The matrix $R_c$ is a square matrix of size $N_s \cdot Q$.

Because the matrix $R_c$ is a block circular matrix, the block Fast Fourier transform (FFT) can be used to realize the algorithm. With this approach the matrix $R_c$ can be decomposed as:

$$R_c = F_{(Q)}^{-1} \Lambda_R F_{(Q)} \quad \text{Equation (13)}$$

with $$F_{(Q)} = F_{N_s} \otimes I_{(Q)}, \quad \text{Equation (14)}$$

where $F_{Ns}$ is the $N_s$-point FFT matrix, $I_Q$ is the identity matrix of size Q and the notation $\otimes$ is the Kronecker product. By definition, the Kronecker product Z of matrix X and Y, $(Z = X \otimes Y)$ is:

$$Z = \begin{bmatrix} x_{11}Y & x_{12}Y & \ldots & x_{1N}Y \\ x_{21}Y & x_{21}Y & & x_{2N}Y \\ \vdots & & \ddots & \\ x_{M1}Y & x_{M1}Y & & x_{MN}Y \end{bmatrix},$$ Equation (15)

where $x_{m,n}$ is the $(m,n)^{th}$ element of matrix X. For each $F_{(Q)}$, a Ns-point FFT is performed Q times. $\Lambda_R$ is a block-diagonal matrix whose diagonal blocks are $F_{(Q)}R_C(:,1:Q)$. That is, $$\text{diag}(\Lambda_R) = F_{(Q)}R_C(:,1:Q),$$ Equation (16)

where $R_C(:,1:Q)$ denotes the first Q columns of matrix $R_C$.

The block circular matrix can be decomposed into simple and efficient FFT components, making a matrix inverse more efficient and less complex. Usually, the large matrix inverse is more efficient when it is performed in the frequency domain rather than in a time domain. For this reason, it is advantageous to use FFT and the use of a block circular matrix enables efficient FFT implementation. With proper partition, the matrix H can be expressed as an approximate block circular matrix of the form:

$$H = \begin{bmatrix} H_0 & & & \\ H_1 & H_0 & & \\ H_2 & H_1 & & \\ \vdots & H_2 & & \\ H_{L-1} & \vdots & & \\ & H_{L-1} & \ddots & H_0 \\ & & & H_1 \\ & & & H_2 \\ & & & \vdots \\ & & & H_{L-1} \end{bmatrix},$$ Equation (17)

where each H, i=0, 1, ..., L−1 is a square matrix of size Q. L is the number of data symbols affected by the delay spread of propagation channel and is expressed as:

$$L = \left\lceil \frac{Q+W-1}{Q} \right\rceil.$$

The block circular matrix $H_C$ is obtained by expanding the columns of matrix H in Equation (17) by circularly downshifting one element block successively.

The matrix $H_C$ can be decomposed by block FFT as:

$$H_C = F_{(Q)}^{-1} \Lambda_H F_{(Q)},$$ Equation (20)

where $\Lambda_H$ is a block-diagonal matrix whose diagonal blocks are $F_{(Q)}H_C(:,1:Q)$; and $$\text{diag}(\Lambda_H) = F_{(Q)}H_C(:,1:Q),$$ Equation (21)

where $H_C(:,1:Q)$ denotes the first Q columns of matrix $H_C$.

From Equation (20), $H_C^H$ can be defined as $$H_C^H = F_{(Q)}^{-1} \Lambda_H^H F_{(Q)}.$$ Equation (22)

Substituting matrix $R_c$ and $H_C$ into Equation 10, ŝ is obtained:

$$\hat{s} = F_{(Q)}^{-1} \Lambda_H^H (\Lambda_H \Lambda_R \Lambda_H^H + \sigma^2 I)^{-1} F_{(Q)} r.$$ Equation (23)

For a zero forcing (ZF) solution, equation 19 is simplified to $$\hat{s} = F_{(Q)}^{-1} \Lambda_R^{-1} \Lambda_H^{-1} F_{(Q)} r.$$ Equation (24)

The matrix inverse in Equations (23) and (24) can be performed using Cholesky decomposition and forward and backward substitutions.

In a special case of K=SF (where the number of active codes equals the spreading factor), the matrix $R_C$ becomes a scalar-diagonal matrix with identical diagonal elements equal to the SF. In this case, Equations (10) and (11) reduce to:

$$\hat{s} = H^H \left( HH^H + \frac{\sigma^2}{Q} I \right)^{-1} r$$ Equation (25)

and $$\hat{d} = \frac{1}{Q} C^H \hat{s}.$$ Equation (26)

Equation (25) can also be expressed in the form of:

$$\hat{s} = \left( H^H H + \frac{\sigma^2}{Q} I \right)^{-1} H^H r.$$ Equation (27)

With FFT, Equations (25) and (27) can be realized by:

$$\hat{s} = F^{-1} \Lambda_H^* \left( \Lambda_H \Lambda_H^* + \frac{\sigma^2}{Q} I \right)^{-1} F r$$ Equation (28)

and $$\hat{s} = F^{-1} \left( \Lambda_H^* \Lambda_H + \frac{\sigma^2}{Q} I \right)^{-1} \Lambda_H^* F r$$ Equation (29)

respectively. $\Lambda_H$ is a diagonal matrix whose diagonal is F·H(:,1) in which H(:,1) denotes the first column of matrix H. The notation $(.)^*$ denotes the conjugate operator.

Figure 2:
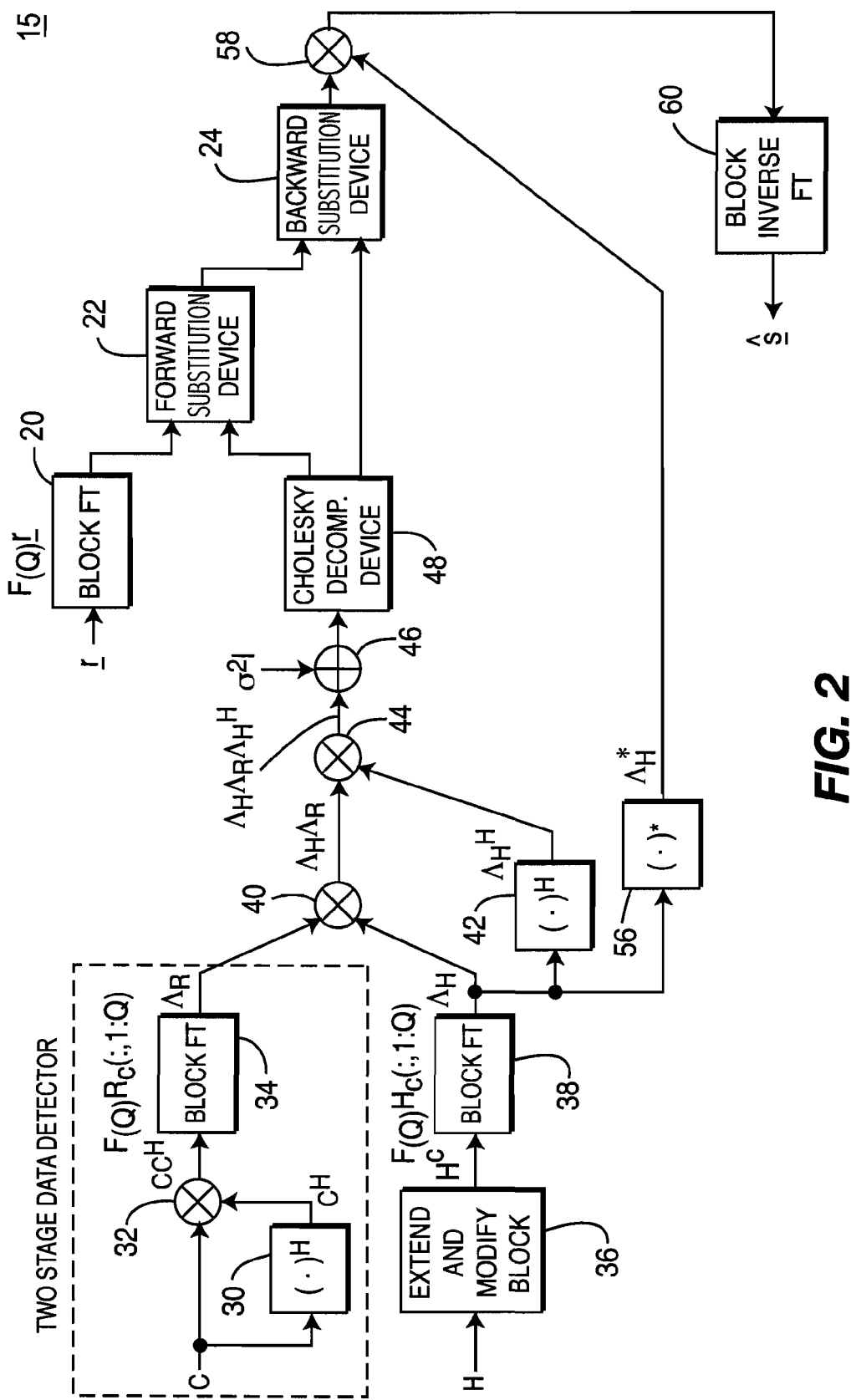
FIG. 2 is a block diagram of an embodiment of two-stage data detection.

FIG. 2 is a preferred block diagram of the channel equalizer 15. A code matrix C is input into the channel equalizer 15. A Hermitian device 30 takes a complex conjugate transpose of the code matrix C, $C^H$. The code matrix C and its Hermitian are multiplied by a multiplier 32, producing $CC^H$. A block FT performed on $CC^H$, producing block diagonal matrix $\Lambda_R$.

The channel response matrix H is extended and modified by an extend and modify device 36, producing $H^C$. A block FT 38 takes $H_C$ and produces block diagonal matrix $\Lambda_H$. A multiplier 40 multiplies $\Lambda_H$ and $\Lambda_R$ together, producing $\Lambda_H \Lambda_R$. A Hermitian device 42 takes the complex conjugate transpose of $\Lambda_H$, producing $\Lambda^H{}_H$. A multiplier 44 multiplies $\Lambda^H{}_H$ to $\Lambda_H \Lambda_R$, producing 79 $_H \Lambda_R \Lambda^H{}_H$, which is added in adder 46 to $\sigma^2 I$, producing $\Lambda_H \Lambda_R \Lambda^H{}_H + \sigma^2 I$.

A Cholesky decomposition device 48 produces a Cholesky factor. A block FT 20 takes a block FT of the received vector r. Using the Cholesky factor and the FT of r, forward and backward substitution are performed by a forward substitution device 22 and backward substitution device 24.

A conjugation device 56 takes the conjugate of $\Lambda_H$, producing $\Lambda^*{}_H$. The result of backward substitution is multiplied at multiplier 58 to $\Lambda^*{}_H$. A block inverse FT device 60 takes a block inverse FT of the multiplied result, producing ŝ.

According to another embodiment of the present invention, an approximate solution is provided in which the generalized two-stage data detection process is a block-diagonal-approximation. The block-diagonal-approximation includes off-diagonal entries as well as the diagonal entries in the approximation process.

As an example, the case of four channelization codes is considered. $R_o$, a combination of four channelization codes, comprises a constant block diagonal part, which does not vary with the different combinations of the codes, and an edge part which changes with the combinations. In general $R_o$ has the structure of:

$$R_0 = \begin{bmatrix} c & c & x & x & & & & \\ c & c & x & x & & & & \\ x & x & c & c & & & & \\ x & x & c & c & & & & \\ & & & & \ddots & & & \\ & & & & & c & c & x & x \\ & & & & & c & c & x & x \\ & & & & & x & x & c & c \\ & & & & & x & x & c & c \end{bmatrix}, \quad \text{Equation (30)}$$

where elements denoted as c represent constants and are always equal to the number of channelization codes, i.e., c=K. The elements designated as x represent some variables whose values and locations vary with different combinations of channelization codes. Their locations vary following certain patterns depending on combinations of codes. As a result only a few of them are non-zero. When code power is considered and is not unity power, the element c equals the total power of transmitted codes. A good approximation of the matrix $R_o$ is to include the constant part and ignore the variable part as:

$$\hat{R}_0 = \begin{bmatrix} c & c & & & & & & \\ c & c & & & & & & \\ & & c & c & & & & \\ & & c & c & & & & \\ & & & & \ddots & & & \\ & & & & & c & c & \\ & & & & & c & c & \\ & & & & & & & c & c \\ & & & & & & & c & c \end{bmatrix}. \quad \text{Equation (31)}$$

In this case, the approximation $\hat{R}_0$ contains only a constant part. $\hat{R}_0$ depends only on the number of active codes regardless of which codes are transmitted, and $\hat{R}_C$ can be decomposed as shown in Equation (13). The block diagonal of $\Lambda_R$ or $F_{(Q)}\hat{R}_C(:,1:Q)$ can be pre-calculated using an FFT for different numbers of codes and stored as a look-up table. This reduces the computational complexity by not computing $F_{(Q)}R_C(:,1:Q)$. In the case, that code power is considered and is not unity power, the element c becomes total power of active codes, (i.e., c=$P_T$ in which $P_T$ is the total power of active codes). The matrix $\hat{R}_0$ can be expressed as $$\hat{R}_0 = P_{avg} \cdot \begin{bmatrix} K & K & & & & & & \\ K & K & & & & & & \\ & & K & K & & & & \\ & & K & K & & & & \\ & & & & \ddots & & & \\ & & & & & \ddots & & \\ & & & & & & K & K & \\ & & & & & & K & K & \\ & & & & & & & & K & K \\ & & & & & & & & K & K \end{bmatrix}, \quad \text{Equation (32)}$$

where $P_{avg}$ is the average code power obtained by $$P_{avg} = \frac{P_T}{K}.$$

In this case, a scaling $P_{avg}$ should be applied in the process.

Other variants of block-diagonal approximation method can be derived by including more entries other than the constant block-diagonal part. This improves performance but entails more complexity because by including variable entries the FFT for $F_{(Q)}R_C(:,1:Q)$ has to be now recalculated as needed if the codes change. The use of more entries enhances the exact solution as all of the off-diagonal entries are included for processing.

At a given number of channelization codes, one can derive the code sets for different combinations of channelization codes that have common constant part of the correlation matrix whose values are equal to the number of channelization codes, or the total power of channelization codes when the code does not have unity code power. To facilitate the low complexity implementation, the assignment of channelization codes or resource units can be made following the rules that a code set is randomly picked among the code sets that have common constant part and those codes in the picked code set are assigned. For example of assignment of four codes, the code sets [1,2,3,4], [5,6,7,8], [9,10,11,12], . . . have the common constant part in their correlation matrix. When channel assignment of four codes is made, one of those code sets should be used for optimal computational efficiency.

Figure 3:
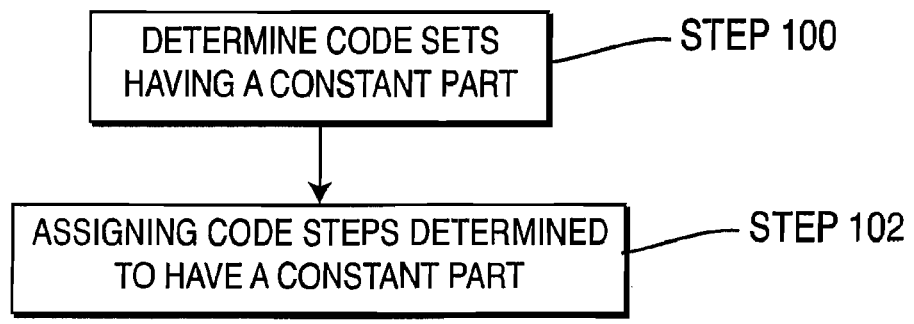
FIG. 3 is a block diagram of code assignment to reduce the complexity of two-stage data detection.

FIG. 3 is a flow diagram of such a channel code assignment. Code sets having a constant part are determined, step 100. When assigning codes, the code sets having the constant part are used, step 102.

Figure 4A:
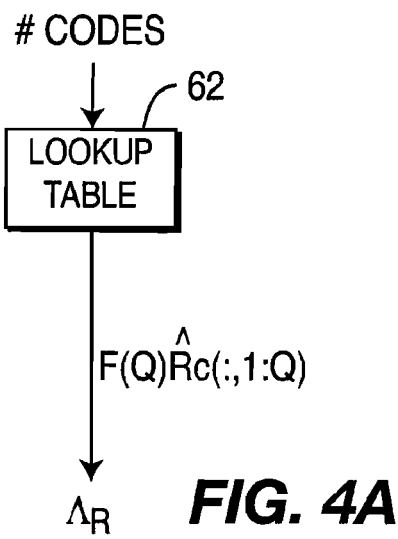
FIGS. 4A-4D are block diagrams of utilizing look-up tables to determine $\Lambda_R$.
Figure 4B:
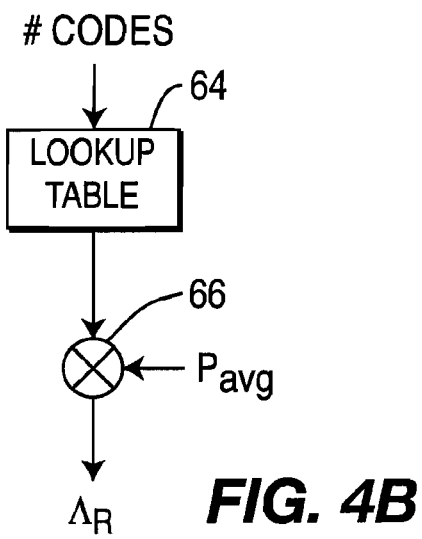

FIGS. 4A, 4B, 4C and 4D are illustrations of preferred circuits for reducing the complexity in calculating $\Lambda_R$. In FIG. 4A, the number of codes processed by the two stage data detector are put in a look-up table 62 and the $\Lambda_R$ associated with that code number is used. In FIG. 4B, the number of codes processed by the two stage data detector are put in a look-up table 64 and an unscaled $\Lambda_R$ is produced. The unscaled $\Lambda_R$ is scaled, such as by a multiplier 66 by $P_{avg}$, producing $\Lambda_R$.

Figure 4C:
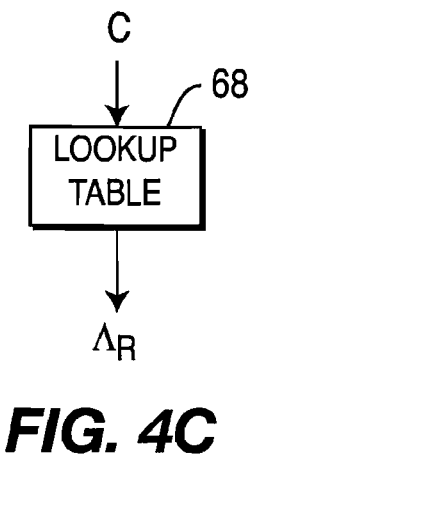
Figure 4D:
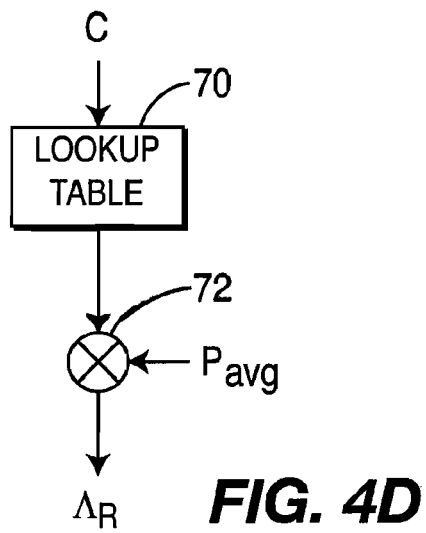

In FIG. 4C, the code matrix C or code identifier is input into a look-up table 68. Using the look-up table 68, the $\Lambda_R$ is determined. In FIG. 4D, the code matrix C or code identifier is input into a look-up table 70, producing an unscaled $\Lambda_R$. The unscaled $\Lambda_R$ is scaled, such as by a multiplier 72 by $P_{avg}$, producing $\Lambda_R$.

What is claimed is:

1. A wireless transmit/receive unit (WTRU) comprising:
an antenna configured to wirelessly receive signals in a shared spectrum where the received signals comprise encoded symbols;
a sampling device configured to sample a received signal to produce received signal samples;
a channel equalizer configured to process the received signal samples using an estimated channel response matrix H to produce a spread signal estimate of the received signal that can be despread to recover the encoded symbols of the received signal;
the channel equalizer including a lookup table that stores code block diagonal matrices corresponding to signal codes or numbers of signal codes for a plurality of signals such that a respective code block diagonal matrix for signal codes of the received signal can be output based on the signal codes or a number of signal codes of the received signal;
the channel equalizer configured to produce a channel response block diagonal matrix from the estimated channel response matrix H; and
the channel equalizer configured to combine the respective code block diagonal matrix and the channel response block diagonal matrix such that the received signal samples are processed using the combined code block diagonal and channel response block diagonal matrices to produce the spread signal estimate of the received signal.

2. The WTRU of claim 1 wherein the code block diagonal matrices stored in the lookup table correspond to a Fourier transform of a code matrix multiplied by a complex conjugate transpose of the code matrix for respective signal codes.

3. The WTRU of claim 1 wherein the channel equalizer includes a multiplier associated with the lookup table configured to multiply the respective code block diagonal matrix output from the lookup table with a scaling factor before combining with the channel response block diagonal matrix.

4. The WTRU of claim 3 wherein the multiplier is configured to multiply the respective code block diagonal matrix with an average power level as the scaling factor.

5. The WTRU of claim 1 wherein the channel equalizer is configured to input the number of signal codes of the received signal to the lookup table to output the respective code block diagonal matrix.

6. The WTRU of claim 1 wherein the channel equalizer is configured to input the signal codes of the received signal to the lookup table to output the respective code block diagonal matrix.

7. The WTRU of claim 1 wherein the channel equalizer is configured to process the received signal samples using the combined code block diagonal and channel response block diagonal matrices with a noise variance $\sigma^2$ and a Cholesky algorithm and to perform a block inverse Fourier transform on a result of the Cholesky algorithm to produce the spread signal estimate of the received signal.

8. The WTRU of claim 7 wherein the channel equalizer is configured to process the received signal samples using the combined code block diagonal and channel response block diagonal matrices with the noise variance $\sigma^2$ and the Cholesky algorithm by adding a factor of the noise variance $\sigma^2$ multiplied with an identity matrix.

9. A method for a wireless transmit/receive unit (WTRU) comprising:
wirelessly receiving a signal signals in a shared spectrum where the received signals comprise encoded symbols;
sampling a received signal to produce received signal samples;
equalizing the received signal samples using an estimated channel response matrix H to produce a spread signal estimate of the received signal that can be despread to recover the encoded symbols of the received signal; and
the equalizing including:
using a lookup table that stores code block diagonal matrices corresponding to signal codes or numbers of signal codes for a plurality of signals to output a respective code block diagonal matrix for signal codes of the received signal based on the signal codes or a number of signal codes of the received signal;
producing a channel response block diagonal matrix from the estimated channel response matrix H;
combining the respective code block diagonal matrix and the channel response block diagonal matrix; and
processing the received signal samples using the combined code block diagonal and channel response block diagonal matrices to produce the spread signal estimate of the received signal.

10. The method of claim 9 wherein the code block diagonal matrices stored in the lookup table correspond to a Fourier transform of a code matrix multiplied by a complex conjugate transpose of the code matrix for respective signal codes.

11. The method of claim 9 wherein the equalizing includes multiplying the respective code block diagonal matrix output from the lookup table with a scaling factor before combining with the channel response block diagonal matrix.

12. The method of claim 11 wherein the multiplying the respective code block diagonal matrix is with an average power level as the scaling factor.

13. The method of claim 9 wherein the number of signal codes of the received signal is input to the lookup table to output the respective code block diagonal matrix.

14. The method of claim 9 wherein the signal codes of the received signal are input to the lookup table to output the respective code block diagonal matrix.

15. The method of claim 9 wherein the equalizing includes processing the received signal samples using the combined code block diagonal and channel response block diagonal matrices with a noise variance $\sigma^2$ and a Cholesky algorithm and performing a block inverse Fourier transform on a result of the Cholesky algorithm to produce the spread signal estimate of the received signal.

16. The method of claim 15 wherein the equalizing includes processing the received signal samples using the combined code block diagonal and channel response block diagonal matrices with the noise variance $\sigma^2$ and the Cholesky algorithm by adding a factor of the noise variance $\sigma^2$ multiplied with an identity matrix.

* * * * *